(12) United States Patent  
Soborski et al.

(10) Patent No.: US 12,169,922 B2  
(45) Date of Patent: Dec. 17, 2024

(54) SYNTHETIC IMAGE GENERATION USING ARTIFICIAL INTELLIGENCE

(71) Applicant: Sys-Tech Solutions, Inc., Princeton, NJ (US)

(72) Inventors: Michael Soborski, Allentown, NJ (US); Bodhayan Dev, Sturbridge, MA (US); Matthias Voigt, Lawrenceville, NJ (US); Atish P. Kamble, Acton, MA (US); Prem Swaroop, Lexington, MA (US)

(73) Assignee: Sys-Tech Solutions, Inc., Princeton, NJ (US)

( * ) Notice: Subject to any disclaimer, the term of this patent is extended or adjusted under 35 U.S.C. 154(b) by 453 days.

(21) Appl. No.: 17/692,077

(22) Filed: Mar. 10, 2022

(65) Prior Publication Data

US 2023/0289952 A1     Sep. 14, 2023

(51) Int. Cl.
*G06T 7/00*     (2017.01)

(52) U.S. Cl.
CPC ............. *G06T 7/0008* (2013.01); *G06T 7/97* (2017.01); *G06T 2207/20081* (2013.01); *G06T 2207/20084* (2013.01)

(58) Field of Classification Search
CPC .... G06V 10/774; G06V 10/764; G06N 5/022; G06N 3/045; G06N 3/08; G06N 20/00;
(Continued)

(56) References Cited

U.S. PATENT DOCUMENTS 7,168,621 B2     1/2007  Ghai et al.
7,287,698 B2 *  10/2007  Barrus ............... G06K 17/0016
                                                          235/462.15

(Continued)

FOREIGN PATENT DOCUMENTS

CA         2973849        9/2015
CN       110490791       11/2019
(Continued)

OTHER PUBLICATIONS

U.S. Appl. No. 63/292,706, filed Dec. 22, 2021, Dev et al.
(Continued)

*Primary Examiner* — Aaron W Carter
(74) *Attorney, Agent, or Firm* — Fish & Richardson P.C.

(57) ABSTRACT

Methods, systems, and apparatus, including medium-encoded computer program products, for generating synthetic images, include: obtaining a captured image of a symbol that encodes data; producing a synthetic image from the captured image using a trained machine learning model, wherein the trained machine learning model has been trained using first images and second images of examples of symbols, wherein the second images have a second image quality that is different than a first image quality of first images, and wherein parameters of the machine learning model have been adjusted responsive to image features to tradeoff content loss versus style loss using measurements of information content correlation between third images produced during training and each of the first images and the second images, the measurements being from a comparison metric; and providing the synthetic image for use by a program configured to identify information in images of symbols.

20 Claims, 7 Drawing Sheets

(58) Field of Classification Search
CPC ..... G06N 5/02; G06F 18/214; G06F 18/2414; G06F 18/2451
See application file for complete search history.

(56) References Cited

U.S. PATENT DOCUMENTS

| | | | |
|---|---|---|---|
| 8,181,876 | B2 | 5/2012 | Smith |
| 8,523,075 | B2 | 9/2013 | Van Der Merwe |
| 8,905,314 | B2 | 12/2014 | Van der Merwe et al. |
| 8,950,662 | B2 | 2/2015 | Soborski |
| 9,519,942 | B2 | 12/2016 | Soborski |
| 9,594,977 | B2 | 3/2017 | Lin et al. |
| 9,940,572 | B2 | 4/2018 | Soborski |
| 10,061,958 | B2 | 8/2018 | Voigt et al. |
| 10,234,497 | B2 | 3/2019 | Chang et al. |
| 10,235,597 | B2 | 3/2019 | Voigt et al. |
| 10,318,889 | B2 | 6/2019 | Xu |
| 10,380,601 | B2 | 8/2019 | Soborski |
| 10,387,703 | B2 | 8/2019 | Soborski |
| 10,482,303 | B2 | 11/2019 | Soborski |
| 10,546,171 | B2 | 1/2020 | Soborski |
| 10,552,848 | B2 | 2/2020 | Soborski |
| 10,650,211 | B2 | 5/2020 | Olivastri |
| 10,650,495 | B2 | 5/2020 | Zhang et al. |
| 10,832,026 | B2 | 11/2020 | Soborski |
| 10,922,699 | B2 | 2/2021 | Soborski |
| 11,875,259 | B1* | 1/2024 | Li .................. G06N 3/08 |
| 12,001,916 | B1* | 6/2024 | Lampright .......... G06K 7/1413 |
| 2015/0379321 | A1 | 12/2015 | Soborski |
| 2016/0267304 | A1 | 9/2016 | Wu et al. |
| 2017/0347060 | A1* | 11/2017 | Wang .................. G06T 3/4053 |
| 2018/0068463 | A1* | 3/2018 | Risser .................. G06T 7/45 |
| 2020/0380229 | A1 | 12/2020 | Peruch et al. |
| 2023/0196382 | A1* | 6/2023 | Dev .................. G07D 7/12 705/318 |
| 2023/0289922 | A1* | 9/2023 | Soborski ............ G06T 7/246 |
| 2023/0289952 | A1* | 9/2023 | Soborski ............ G06T 7/0008 |
| 2023/0367983 | A1* | 11/2023 | Zagaynov .......... G06K 7/1443 |

FOREIGN PATENT DOCUMENTS

| | | |
|---|---|---|
| CN | 110717450 | 1/2020 |
| CN | 110852937 | 2/2020 |
| CN | 111241873 | 6/2020 |
| CN | 112396058 | 2/2021 |
| EP | 3000073 | 3/2016 |
| EP | 3259918 | 12/2017 |
| EP | 3507773 | 7/2019 |
| WO | WO 2019168381 | 9/2019 |
| WO | WO 2021068142 | 4/2021 |

OTHER PUBLICATIONS

Azim, "Identification of Textile Defects Based on GLCM and Neural Networks," Journal of Computer and Communications, Oct. 2015, 3(12):1-8.

Gatys et al., "Image Style Transfer Using Convolutional Neural Networks", Presented at IEEE Conference on Computer Vision and Pattern Recognition (CVPR), Las Vegas, NV, USA, Jun. 27-30, 2016, pp. 2414-2423.

genuinecoder.com [online], "Fake (Photoshopped) Image Detection using Machine Learning," available on or before Nov. 2018, retrieved on Apr. 28, 2022, retrieved from URL<https://www.genuinecoder.com/fake-photoshopped-image-detection-using-machine-learning/>, 2 pages.

heartbeat.comet.ml [online], "Image Classification on Mobile with Flutter, TensorFlow Lite, and Teachable Machine," Sep. 14, 2020, retrieved on Apr. 28, 2022, retrieved from URL<https://heartbeat.comet.ml/image-classification-on-mobile-with-flutter-tensorflow-lite-and-teachable-machine-f7de39598e0c>, 10 pages.

heartbeat.comet.ml [online], "TensorFlow Lite Image Classification Models with Model Maker," Mar. 18, 2021, retrieved on Apr. 28, 2022, retrieved from URL<https://heartbeat.comet.ml/tensorflow-lite-image-classification-models-with-model-maker-a144801d2abd>, 11 pages.

IEEE Standards Association, "754-2019—IEEE Standard for Floating-Point Arithmetic," Jul. 22, 2019, 84 pages.

Li et al., "Style transfer for QR code", Multimedia Tools and Applications, Dec. 2020, 14 pages.

Shang et al., "Detecting documents forged by printing and copying," EURASIP Journal on Advances in Signal Processing, Sep. 8, 2014, 15 pages.

Stenhagen et al., "Improving Realism in Synthetic Barcode Images using Generative Adversarial Networks", Master of Science Thesis in Electrical Engineering, Linköping University, 2018, 83 pages.

Tchan et al., "The Use of Neural Networks in an Image Analysis System to Distinguish Between Laser Prints and Their Photocopies," Jopurnal of Imaging Science and Technology, Mar. 2000, 44(2):132-144.

Tchan, "Classifying digital prints according to their production process using image analysis and artificial neural networks," Optical Security and Counterfeit Deterrence Techniques III, Apr. 7, 2000, pp. 105-116.

Vohra et al., "Signature Verification Using Support Vector Machine and Convolution Neural Network," Turkish Journal of Computer and Mathematics Education, Nov. 2020, 12(1S):80-89.

Zharkov et al., "Universal Barcode Detector via Semantic Segmentation," arXiv, Jun. 17, 2019, 7 pages.

* cited by examiner

SYNTHETIC IMAGE GENERATION USING ARTIFICIAL INTELLIGENCE

BACKGROUND

This specification relates to the technical field of machine vision or computer vision. This specification also relates to the technical field of anti-counterfeiting and item serialization for the purpose of track-and-trace supply chain security.

Symbols are applied to an item to uniquely identify the item. For example, a universal product code (UPC), a barcode or a quick response (QR) code can be printed on a product when the product is being manufactured on a product line. A symbol encodes information in accordance with a predefined symbology. The symbol can be used to trace the distribution of items and can be used to detect counterfeit items.

Counterfeit items are widely available and often hard to spot. When counterfeiters produce fake items, they typically copy the associated symbology including a symbol, in addition to the actual items. To the human eye, a photocopy or counterfeit symbol can appear genuine and even yield the appropriate message (e.g., decode to the appropriate message associated with the symbology). Many of the technologies currently available to counter such copying rely on visually comparing an image of a possible counterfeit symbol with an image of an original, genuine symbol.

Natural variations in a symbol applied to an item can be a way of establishing information or data specific to that item, and therefore can be used to trace the item or detect fake items. The natural variations in a symbol can be referred to as a "fingerprint" or a "fingerprint signature" of the symbol. The fingerprint signature is derived from the unique physical and optical characteristics of the symbol's geometry and appearance and can uniquely identify the item.

SUMMARY

This specification describes technologies relating to generating synthetic images of a symbol from high-fidelity images of the same symbol using a neural network.

Fingerprint algorithms, which can employ machine learning (e.g., deep learning) algorithms, can be developed for symbol tracing and counterfeit detection based on fingerprint signatures in the symbols. For example, a fingerprint algorithm can be trained to distinguish authentic and fake barcodes based on fingerprint signatures of the barcodes. However, these fingerprint algorithms usually require a large amount of training data. In order to improve the fingerprint algorithms that are based on fingerprint signature, a large quantity of images that capture the symbols are very useful. For example, a large amount of images captured by cell phones can be essential for the training of the fingerprint algorithms that process cell phone images. Without sufficient amounts of training images, further development of the fingerprint algorithms can be limited.

In general, one or more aspects of the subject matter described in this specification can be embodied in one or more methods (and also one or more non-transitory computer-readable mediums tangibly encoding a computer program operable to cause data processing apparatus to perform operations) including: obtaining, by at least one data processing device, a captured image of a symbol of a symbology type that encodes data; producing, by the at least one data processing device, a synthetic image from the captured image using a trained machine learning model, and the trained machine learning model has been trained using (i) first images of examples of symbols of the symbology type, and (ii) second images of the examples of symbols of the symbology type, and the first images have a first image quality, the second images have a second image quality that is different than the first image quality, and one or more parameters of the machine learning model have been adjusted responsive to one or more image features to tradeoff content loss versus style loss using measurements of information content correlation between third images produced during training and each of the first images and the second images, the measurements being from a comparison metric associated with the symbology type; and providing, by the at least one data processing device, the synthetic image produced by the trained machine learning model for use by a program configured to identify information in images of symbols of the symbology type.

The trained machine learning model can include a convolutional neural network, and the one or more parameters can include content and style parameters of the convolutional neural network. The content and style parameters can include convolutional layers that have been used to compute the content loss and the style loss, and the content and style parameters have been adjusted iteratively by running a grid search over suitable convolutional layers to find optimized convolutional layers. The comparison metric associated with the symbology type can be generated by a symbology fingerprint algorithm, and the content and style parameters have been adjusted using measurements of fingerprint correlation scores between the third images produced during the training and each of the first images and the second images. The fingerprint correlation scores between the third images produced during the training and each of the first images and the second images can include: first correlation scores between the third images and the first images, second correlation scores between the third images and the first images, first correlation scores between the third images and the second images, and second correlation scores between the third images and the second images.

The first images have been captured with a first image capturing device, the second images have been captured with at least two second image capturing devices, and each of the at least two second image capturing devices can be of a different type than the first image capturing device and each remaining one or more of the at least two second image capturing devices. The comparison metric associated with the symbology type can be generated by a symbology fingerprint algorithm, and the program can employ the symbology fingerprint algorithm, and the obtaining can include receiving the captured image from an image capturing device positioned on a product line in which the symbol was printed on a product, and the providing can include using the symbology fingerprint algorithm in the program to verify the symbol printed on the product by processing the synthetic image. The comparison metric associated with the symbology type can include one or more image similarity metrics. The synthetic image produced by the trained machine learning model can preserve an original fingerprint signature in the symbol. The program can employ a symbology fingerprint algorithm being developed, and the providing can include using the synthetic image to test the symbology fingerprint algorithm being developed. The one or more methods (and also one or more non-transitory computer-readable mediums tangibly encoding a computer program operable to cause data processing apparatus to perform operations) can include training the trained machine learning model using fourth images and either the first images or fifth images to update the trained machine learning model in view of changes in one or more image capture devices, and the fourth images can have a third image quality that is different than the first image quality or than an image quality of the fifth images, and the third image quality can correspond to the changes in the one or more image capture devices.

One or more aspects of the subject matter described in this specification can also be embodied in one or more systems including: at least one processor, and at least one non-transitory storage media storing instructions that, when executed by the at least one processor, cause the at least one processor to: obtain a captured image of a symbol of a symbology type that encodes data; produce a synthetic image from the captured image using a trained machine learning model, wherein the trained machine learning model has been trained using (i) first images of examples of symbols of the symbology type, and (ii) second images of the examples of symbols of the symbology type, wherein the first images have a first image quality, the second images have a second image quality that is different than the first image quality, and wherein one or more parameters of the machine learning model have been adjusted responsive to one or more image features to tradeoff content loss versus style loss using measurements of information content correlation between third images produced during training and each of the first images and the second images, the measurements being from a comparison metric associated with the symbology type; and provide the synthetic image produced by the trained machine learning model for use by a program configured to identify information in images of symbols of the symbology type.

Particular embodiments of the subject matter described in this specification can be implemented to realize one or more of the following advantages. Instead of manually capturing images of symbols on items using a mobile device, a large amount of synthetic images can be efficiently generated from high-fidelity images of the symbols using a style transfer neural network. Each synthetic image can preserve the information encoded in the symbol of the high-fidelity image, while also representing style features of images captured by a mobile device. The synthetic images are similar to the images captured by a mobile device such as including features related to degraded image quality and/or quality modifications resulting from a mobile device camera's image enhancement process(es). Furthermore, the synthetic images can preserve the fingerprint signatures of the symbol captured in the high-fidelity images because the style transfer neural network is trained and validated by preserving a three-way correlation mapping between each high-fidelity image across its corresponding actual cell phone image and across its corresponding generated synthetic image.

The subject matter described in this specification can be used to develop and test the quality of the fingerprint algorithm(s) designed to detect features of a symbol, without manually capturing an image of the symbol using a mobile device. In a supply chain or an assembly line, a synthetic image generator can automatically generate synthetic cell phone images of barcodes and the synthetic cell phone images can be provided for use by a fingerprint algorithm to determine whether a package or a shipment is a genuine or counterfeit product, without requiring technicians or operators to capture cell phone images. The synthetic images can be generated during production to predict what the cell phone images of the printed symbols will look like and thus enable determination of the quality of the fingerprints during production (at the production site) without requiring an actual mobile device to capture images of the symbols. The synthetic image generator can expedite the validation and/or authentication process of shipments or products in the supply chain or the assembly line. Further, with a sufficiently large set of synthetic images generated, the generated synthetic images can be used to develop, improve, and test fingerprint algorithms (which can employ machine learning techniques in some implementations) that can determine whether the symbol of a package or a shipment is a genuine or counterfeit product.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
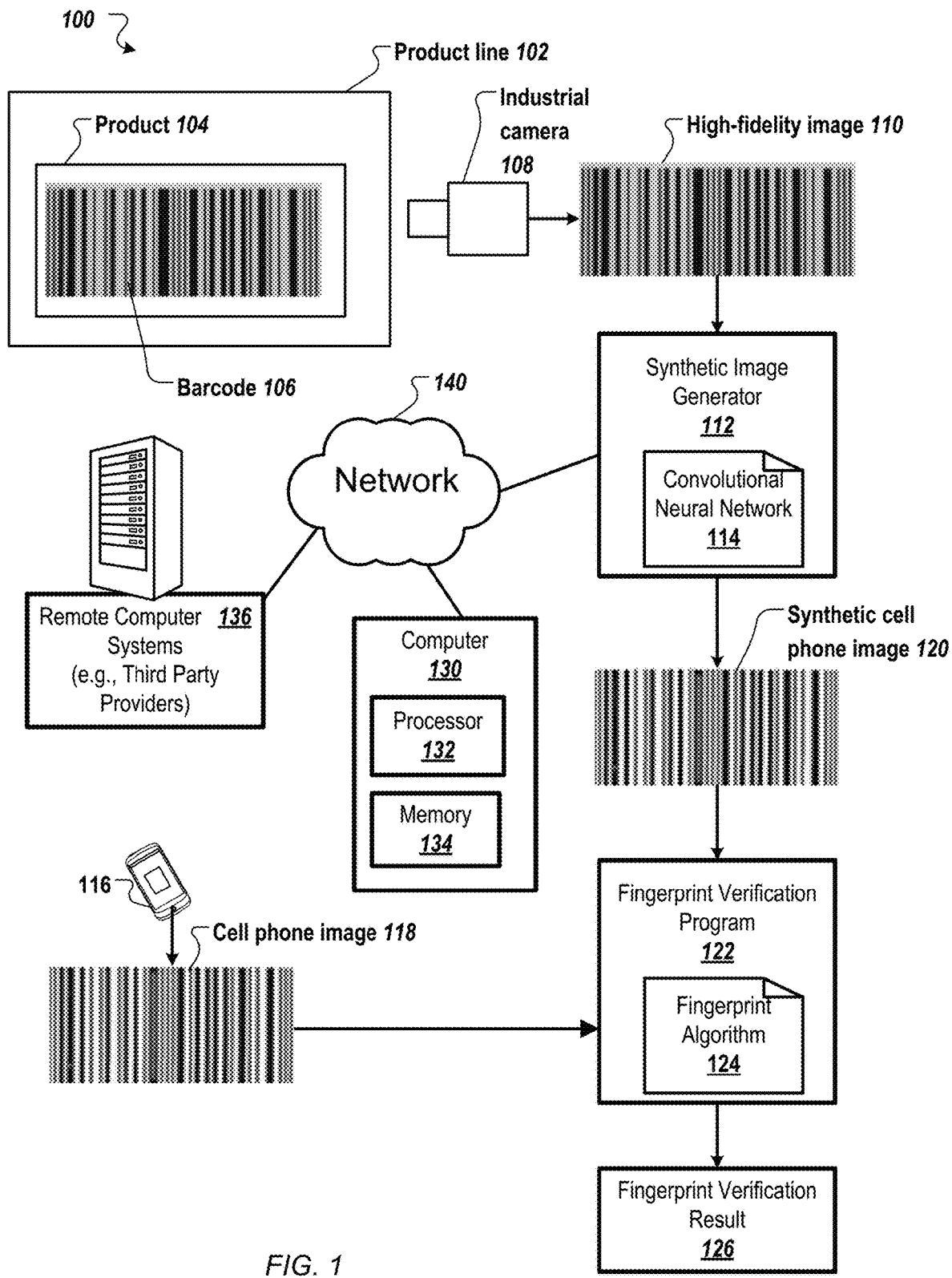
FIG. 1 shows an example of a system usable to generate a synthetic image from a high-fidelity image using a neural network.

FIG. 1 shows an example of a system 100 usable to generate a synthetic image from a high-fidelity image using a neural network. A product 104 is manufactured on a product line 102 and a symbol (e.g., the barcode 106) is applied on the product 104 to uniquely identify the product. The symbol can include a universal product code (UPC), a barcode, a quick response (QR) code, or any other symbol of a symbology type. For example, a barcode 106 can be printed on a shoebox when the shoes are being packaged on a shoe manufacturing product line. The symbol encodes information in accordance with a predefined symbology. For example, the barcode 106 can encode product information (e.g., product category, manufacturing date, price, etc.) of the product 104 and/or data (e.g., a universal resource locator and a product number) usable to retrieve such product information. The symbol can be used to trace the distribution of products and can be used to detect counterfeit products. The system of FIG. 1 is illustrated with a symbol of a barcode type, but similar system components or processes can be applied to any type of symbol that encodes information.

An image capturing device (e.g., an industrial camera 108) is positioned on the product line 102. The industrial camera can capture a high-fidelity image 110 of the symbol (e.g., the barcode 106) printed on the product 104 on the product line 102. The high-fidelity image 110 is generated in an electronic image capture process typically through a machine vision system that can reproduce an actual print of symbology (e.g., barcodes or QR codes) with relatively high accuracy. Different from a low resolution image captured by a cell phone, the high-fidelity image 110 can have a relatively high resolution and a suitable magnification level of a symbol that has been applied on a product. For example, the high-fidelity image 110 can have a spatial resolution that is higher than 50 pixels per millimeter. As another example, the resolution of the high fidelity image can be in the range of (1800-1900)×(800-1100) pixels along the width and height respectively. The high-fidelity image can capture natural variations in the symbol, which can be used to generate a fingerprint signature of the symbol. The fingerprint signature is derived from the unique physical and optical characteristics of the symbol's geometry and appearance and can uniquely identify the product. The fingerprint signature is not easily noticeable by naked eye and can be used to trace the product and detect fake products.

When a product is distributed outside of the manufacturer, e.g., to a distributor or a retailer, a validation program (e.g., a fingerprint verification program 122) can be used to verify whether the product is authentic or fake. A user of the fingerprint verification program 122 can capture an image of the symbol applied on the product using an imaging device (e.g., a cell phone 116) and can submit the captured image (e.g., the cell phone image 118) to the fingerprint verification program 122 to verify whether the symbol applied on the product is authentic. The imaging device can be a mobile device (e.g., the cell phone 116, a tablet, a smart phone), a photocopier, or a scanner. For example, a user can capture an image of the symbol applied on the product by making a photocopy of the symbol using a photocopier or a scanner, and the user can submit the photocopy of the symbol to the fingerprint verification program 122 to verify whether the symbol applied on the product is authentic.

It can be desirable to test the quality of the captured features (e.g., the fingerprint features) of the barcode 106 at the production site. In some implementations, at the production site, a synthetic image generator 112 can generate a synthetic cell phone image 120 from the high-fidelity image 110. The synthetic cell phone image can be a simulation of an actual authentication scan (e.g., a simulation of the cell phone image 118 taken by the cell phone 116). The fingerprint verification program 122 can be used to verify whether the synthetic cell phone image 120 is an image of a barcode of an authentic product. The system can authenticate or validate the quality of the captured fingerprints in the high-fidelity image 110 and/or the synthetic cell phone image 120 by simulating an actual authentication scan, without a need for taking a real cell phone image using a cell phone by a human operator. Because the synthetic cell phone image 120 is a simulation of a cell phone image of an authentic barcode, the fingerprint verification program 122 should generate a verification result indicating that the synthetic cell phone image 120 passes the barcode verification using the fingerprint algorithm 124. If the synthetic cell phone image 120 passes the barcode verification, this indicates that the captured fingerprints have good quality. If the synthetic cell phone image 120 does not pass the barcode verification, this indicates that the captured fingerprints may have bad quality, and the barcode 106 printed on the product 104 can be further examined or tested at the production site.

The fingerprint verification program 122 can include a fingerprint algorithm 124 that can verify the fingerprint signature of the input image of a symbol. For example, the fingerprint algorithm 124 can determine whether a symbol of a package or a shipment is a genuine or counterfeit product. The fingerprint algorithm can be based on a machine learning algorithm, or another type of computer vision or image analysis algorithm. Because the fingerprint signature of a symbol is derived from the unique physical and optical characteristics of the symbol's geometry and appearance, a fake symbol cannot have the same fingerprint signature of an authentic symbol. Therefore, the fingerprint verification program 122 can generate a fingerprint verification result 126 indicating whether the symbol in the input image is authentic or fake.

For example, when a user sees a pair of shoes in a store, the user can capture an image of the barcode on the shoebox using a mobile device. The mobile device can be a cell phone 116, a tablet, a smart phone, a computer, etc. The user can upload a cell phone image 118 of the barcode to a fingerprint verification program 122 to verify the barcode. As another example, a distributor can capture a cell phone image 118 using a cell phone 116. The distributor can verify and trace the distribution of the product by processing the cell phone image 118 using the fingerprint verification program 122.

In order to improve the performance of the fingerprint verification program 122 (e.g., the fingerprint algorithm 124), a large quantity of images that capture the symbols can be used. Sometimes, a large amount of high-fidelity images 110 are available because they can be easily captured at a manufacturing site (e.g., on a product line 102), while only a limited number of cell phone images 118 are available.

A synthetic image generator 112 can be used to efficiently generate a large amount of synthetic cell phone images from high-fidelity images. The synthetic image generator 112 can be implemented in at least one data processing device. The synthetic image generator 112 can take a high-fidelity image 110 as input and can generate a corresponding synthetic cell phone image 120. The synthetic cell phone image 120 can have the same symbol content as the high-fidelity image 110. That is, the synthetic cell phone image 120 includes a symbol that encodes the same information as the information encoded in the high-fidelity image 110. For example, the synthetic cell phone image 120 can include the same product information as represented in the barcode of the high-fidelity image 110.

The synthetic cell phone image 120 can have the same (or similar) style features as the cell-phone image 118. The style features can include degraded image quality and/or quality modifications from a mobile device camera's image enhancement process(es). For example, the style features can include noise patterns, blurriness, darkness, etc., that are represented in a cell phone image. As another example, the style features can include image compression artifacts, such as ringing, contouring, posterizing, staircase noise, blockiness found in lossy image compression algorithms (e.g., JPEG). In some implementations, the synthetic images can represent the features of the cell phone images that are results of the image processing operations (e.g., denoising, sharpening, contrast enhancements) specific to the cell phone. For example, a particular cell phone can have a preconfigured sharpening filter applied to an image captured by the particular cell phone. The synthetic image generator 112 can generate a synthetic cell phone image that represents the sharp features in the actual cell phone images captured by the particular cell phone.

The synthetic cell phone image 120 also has a similar fingerprint signature as the high-fidelity image 110. For example, when the synthetic cell phone image represents a cell phone image of an authentic product, the synthetic cell phone image can preserve the fingerprint signature in the symbol of the authentic product (i.e., the fingerprint signature of the symbol in the high-fidelity image) such that a symbol authentication program (e.g., the fingerprint verification program 122) based on fingerprint algorithm 124 can successfully identify the synthetic cell phone image as an image of a symbol of an authentic product.

The synthetic image generator 112 can include a trained machine learning model that can be trained to generate a synthetic image that has the same symbol content (e.g., barcode content) of the input high-fidelity image, the same fingerprint signature of the input high-fidelity image (e.g., the same variations of a barcode resulting from a printing device used to produce the barcode) and has the same style features of cell phone images of a cell phone device. The machine learning model can include a deep learning model, a convolutional neural network (CNN), or other artificial intelligence systems and techniques. Once trained, the synthetic image generator 112 can predict, from an input high-fidelity image of a symbol (where the input high-fidelity image is a new image that is not part of the training data) what an actual cell phone image of the symbol would look like.

In some implementations, the trained machine learning model can include a convolutional neural network (CNN) 114. In some implementations, the convolutional neural network 114 can be a style transfer neural network (Gatys, Leon A., Alexander S. Ecker, and Matthias Bethge. "*Image style transfer using convolutional neural networks.*" *Proceedings of the IEEE conference on computer vision and pattern recognition.* 2016). The style transfer neural network can be trained and validated by preserving a three-way correlation mapping between each high-fidelity image across its corresponding actual cell phone image and across its corresponding generated synthetic image. In some implementations, the CNN 114 can include VGG (i.e., Visual Geometry Group, a group of researchers at University of Oxford who developed this architecture) neural networks (e.g., VGG-19 and VGG-16) (Simonyan, Karen, and Andrew Zisserman. "*Very deep convolutional networks for large-scale image recognition.*" *arXiv preprint ar Xiv:* 1409.1556 (2014)), EfficientNet (Tan, Mingxing, and Quoc Le. "*Efficientnet: Rethinking model scaling for convolutional neural networks.*" *International Conference on Machine Learning. PMLR,* 2019), InceptionNet (Szegedy, Christian, et al. "*Going deeper with convolutions.*" *Proceedings of the IEEE conference on computer vision and pattern recognition.* 2015), AlexNet (Krizhevsky, Alex, Ilya Sutskever, and Geoffrey E. Hinton. "*Imagenet classification with deep convolutional neural networks.*" *Advances in neural information processing systems* 25 (2012): 1097-1105), MobileNet (Howard, Andrew G., et al. "*Mobilenets: Efficient convolutional neural networks for mobile vision applications.*" *ar Xiv preprint arXiv:* 1704.04861 (2017)), LSTM (i.e., long short-term memory) neural network (Hochreiter, Sepp, and Jürgen Schmidhuber. "*Long short-term memory.*" *Neural computation* 9.8 (1997): 1735-1780), or CNN architectures with custom convolution building blocks.

In some implementations, the convolutional neural network 114 can be other types of neural networks that can perform image translation or image generation. For example, the convolutional neural network 114 can be a Pixel-2-Pixel GAN neural network that can be trained on paired high-fidelity and cell phone images (Isola, Phillip, et al. "*Image-to-image translation with conditional adversarial networks.*" *Proceedings of the IEEE conference on computer vision and pattern recognition.* 2017). As another example, the convolutional neural network 114 can be a Cycle-GAN neural network that can be trained on unpaired high-fidelity and cell phone images (Zhu, Jun-Yan, et al. "*Unpaired image-to-image translation using cycle-consistent adversarial networks.*" *Proceedings of the IEEE international conference on computer vision.* 2017). The convolutional neural network 114 can be implemented or deployed in a computer. The computer can include one or more hardware processors, which can each include multiple processor cores, one or more central processing units (CPUs), and one or more graphics processing units (GPUs). In some implementations, the computer can include off-the-shelf or custom-made parallel processing subsystems, e.g., a GPU or another kind of special-purpose processing subsystems for a neural network.

The machine learning model (e.g., the convolutional neural network 114) can be trained by a neural network training system implemented in a computer 130. The deployment and training of the machine learning model (e.g., the convolutional neural network 114) can be implemented in the same computer or in different computers. The computer 130 includes a processor 132 and a memory 134. The computer 130 can be connected to a network 140, which can be a private network, a public network, a virtual private network, etc. The processor 132 can be one or more hardware processors, which can each include multiple processor cores, one or more central processing units (CPUs), and one or more graphics processing units (GPUs). The memory 134 can include both volatile and non-volatile memory, such as Random Access Memory (RAM) and Flash RAM. The computer 130 can include various types of computer storage media and devices, which can include the memory 134, to store instructions of programs that run on the processor 132, including the program that can update the parameters of a convolutional neural network using training data. Training the machine learning model (e.g., the convolutional neural network 114) can be done at various places. In some implementations, remote computer systems 136 (e.g., one or more third party providers' one or more server systems accessible by the computer 130 via the network 140) can perform the training with the advantage of having larger memory storage and better computation resources. Thus, the training can offload processing operations "to the cloud" by having one or more computational intensive operations run on one or more computers of the remote computer systems 136. In some implementations, one or more computers that implement the synthetic image generator 112 can perform the training of the machine learning model (e.g., the convolutional neural network 114). After training is completed, the training system can send the trained machine learning model (e.g., the trained convolutional neural network 114) and/or the final parameters to the synthetic image generator 112 through the network 140. In some implementations, the computer 130 can include off-the-shelf or custom-made parallel processing subsystems, e.g., a GPU or another kind of special-purpose processing subsystems for a neural network.

The generated synthetic images can be used to develop and test a fingerprint verification algorithm (which can employ machine learning techniques in some implementations) for symbol tracing and counterfeit detection. For example, the synthetic cell phone image 120 can be used to improve the fingerprint verification program 122 that is based on a fingerprint algorithm 124. Because a large amount of synthetic cell phone images can be generated efficiently, there is no need to manually collect a large amount of training images of actual cell phone images (e.g., a cell phone image 118). The symbol verification program (e.g., the fingerprint verification program 122) can be built (e.g., trained) and verified using a large amount of training data (e.g., hundreds or thousands of training images) that includes the synthetic cell phone images, and optionally, some actual cell phone images, thus improving the accuracy and performance of the symbol verification program.

Figure 2:
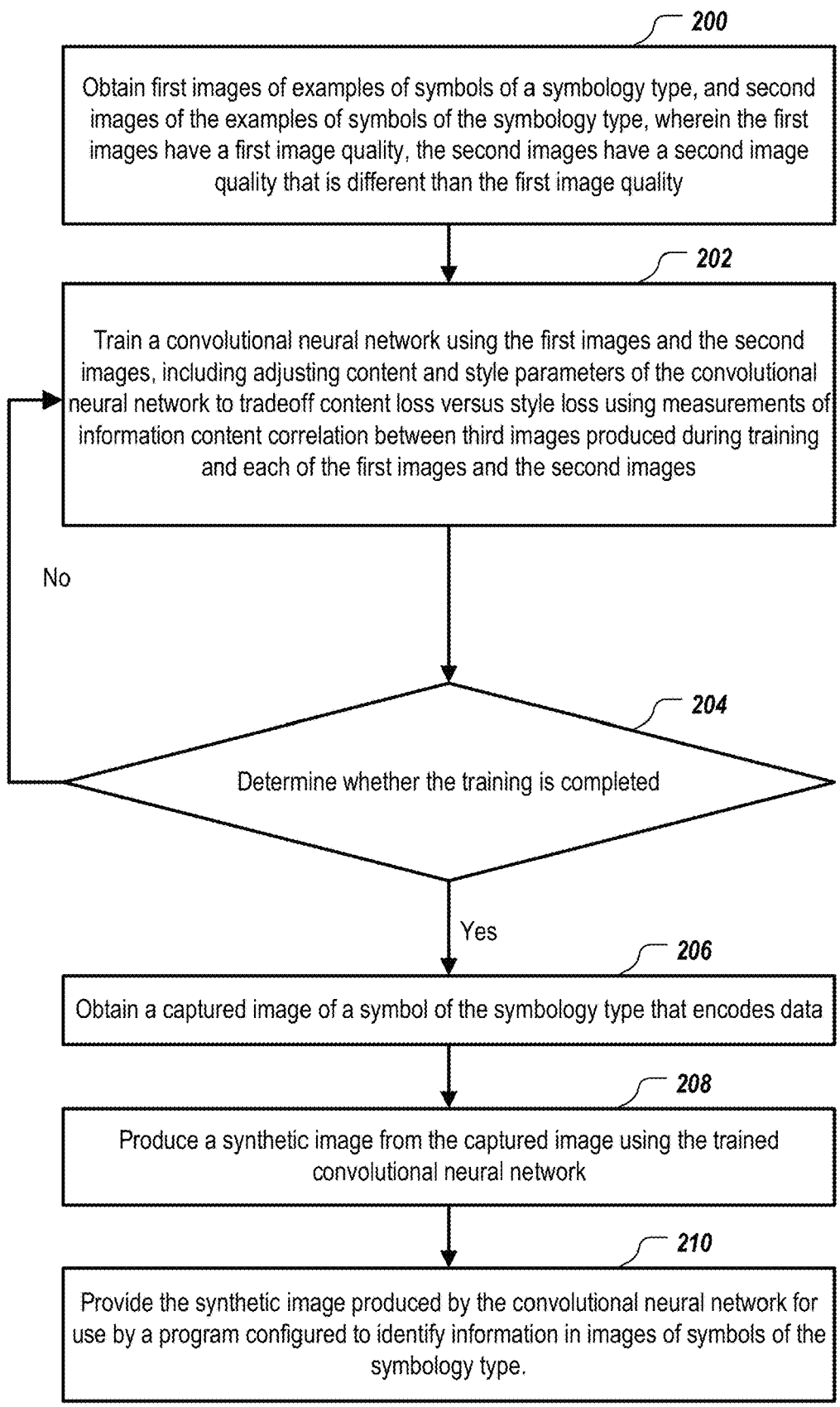
FIG. 2 is a flowchart showing an example of a process to generate a synthetic image from a high-fidelity image using a neural network.

FIG. 2 is a flowchart showing an example of a process to generate a synthetic image from a high-fidelity image using a neural network. Blocks 200, 202, and 204 are related to training a convolutional neural network that can generate a synthetic image. Blocks 200, 202, and 204 can be performed by a computer-implemented training system that performs the training of a convolutional neural network (e.g., the training system depicted in FIG. 1 implemented in computer 130, the network 140, and the remote computer systems 136). Blocks 206, 208, and 210 are related to using a trained convolutional neural network to generate a synthetic image. Blocks 206, 208, and 210 can be performed by a computer-implemented system that can deploy a trained neural network model (e.g., the system 100 depicted in FIG. 1).

A first set of images (or first images) of examples of symbols of a symbology type and a second set of images (or second images) of the examples of symbols of the symbology type are obtained 200. The first set of images have a first image quality, and the second set of images have a second image quality that is different from the first image quality. The first set of images can be high-fidelity images captured by an industrial camera on a product line and the first set of images can have high image quality, e.g., high resolution and low noise. The first set of images can include images of different examples of symbols. For example, the examples of symbols can include 2000 barcodes, and the first set of images can include one high-fidelity image of each of the 2000 barcodes.

The second images are captured by an imaging device that corresponds to the type of imaging device that a user is likely to use in a barcode verification process (e.g., counterfeit detection or product tracing), and is different from the imaging device that captures the first images. The second images can be captured by a mobile device, such as a cell phone, a tablet computer, a smart phone, etc. The second images can be captured by a photocopier or a scanner. The second images can have different image quality than the first images. The second images can have lower resolution and/or higher noise than the first images that are captured by a high-fidelity camera.

Some imaging devices (e.g., a cell phone or smart phone) can have one or more image processing filters that render a particular imaging style. For example, a cell phone camera system can be configured to perform an image enhancement process, including sharpening, contrast enhancement, denoising, etc. Therefore, the second images can have unique style features that correspond to the imaging device.

The second images include images of the same examples of the symbols as the examples of the symbols captured by the first images. That is, an example of the symbol (e.g., a UPC code) can have a pair of images including a first image (e.g., a high-fidelity image) and a second image (e.g., a cell phone image). For example, the examples of symbols can include 2000 barcodes, and the first images can include 2000 high-fidelity images of the 2000 barcodes, and the second images can include 2000 cell phone images of the same 2000 barcodes.

A machine learning model is trained using the first images and the second images, including adjusting one or more parameters of the machine learning model responsive to one or more image features to tradeoff content loss versus style loss. The one or more image features can include features extracted from an image with a computer vision algorithm, such as Haralick, ORB (Oriented FAST and Rotated BRIEF), SIFT (Scale-invariant feature transform), SURF (speeded up robust features), GLCM (Gray-Level Co-occurrence Matrix), LSTM encoder-decoders, and features extract with a CNN. For example, the feature extraction in the synthetic image generation process could be executed with computer vision algorithms such as Haralick, ORB, SIFT, SURF and GLCM based feature extractors. In some implementations, the image features extracted with a computer vision algorithm can be combined with the image features extracted with deep learning or machine learning techniques, such as techniques that use a CNN or LSTM encoder-decoders.

In some implementations, the machine learning model can include a convolutional neural network, and the one or more parameters can include content and style parameters of the convolutional neural network. For example, a convolutional neural network can be trained using the first images and the second images 202, including adjusting content and style parameters of the convolutional neural network responsive to one or more image features to tradeoff content loss versus style loss. The training system can adjust the content and style parameters of the convolutional neural network using measurements of information content correlation between third images (i.e., the generated synthetic images) produced during training and each of the first images and the second images.

Convolutional neural networks include convolutional neural network layers. Convolutional neural network layers have a neuron connectivity that takes advantage of spatially local correlation in the input data. Convolutional neural network layers have one or more parameters that define one or more filters for each layer. A convolutional neural network layer generates an output by performing a convolution of each neuron's filter with the layer's input, followed by an activation function (e.g., a ReLU function). In addition, each convolutional network layer can have neurons in a three-dimensional arrangement, with depth, width, and height dimensions. The width and height dimensions correspond to the two-dimensional features of the layer's input. The depth-dimension includes one or more depth sublayers of neurons.

In some implementations, the convolutional neural network can be a style transfer neural network that can generate, from a content image, a synthetic image that represents one or more desired style features of a style image, while preserving the content data encoded in the content image. An example of the style transfer neural network is the network described in the paper of Gatys, Leon A., Alexander S. Ecker, and Matthias Bethge. *"Image style transfer using convolutional neural networks." Proceedings of the IEEE conference on computer vision and pattern recognition.* 2016. For example, a style transfer neural network can be trained to generate, from a high-fidelity image, a synthetic cell phone image that represents the desired style features of a cell phone image, while preserving the content data encoded in the symbol of the high-fidelity image.

The convolutional neural network can be trained with a collection of training data using an appropriate training technique. The training data includes the content images (e.g., the first images of the high-fidelity images) and the style images (e.g., the second images of the cell phone images) of the examples of symbols. The content images are training images that include the desired content information (e.g., data encoded in the symbol). The style images are training images that include the desired style information of a particular imaging device (e.g., appearance features of a post-processed image generated by a cell phone).

In some implementations, the first images can be captured with a first image capturing device (e.g., a high-fidelity camera installed on a product line), and the second images can be captured with at least two second image capturing devices. Each of the at least two second image capturing devices can be of a different type than the first image capturing device. Each of the at least two second image capturing devices can be of a different type than each remaining one or more of the at least two second image capturing devices (e.g., the image capturing devices can be respective models of smart phones that use different image enhancement process(es) and/or different resolution cameras).

For example, the second images can be captured with two different types of mobile devices, e.g., a cell phone and a tablet computer, or more than one type of cell phone. A single convolutional neural network can be trained to generate synthetic images that represent style features in the second images captured with at least two second image capturing devices. In some implementations, multiple convolutional neural networks can be trained to represent different style features in the images captured by different second image capturing devices. For example, a first convolutional neural network can be trained to capture style features of images captured by a low-end cell phone device (e.g., noisy, low resolution images), and a second convolutional neural network can be trained to capture style features of images captured by a high-end cell phone device (e.g., sharper images).

In some implementations, the trained machine learning model (e.g., the convolutional neural network) can be trained using fourth images and either the first images or fifth images to update the trained machine learning model (e.g., the convolutional neural network) in view of changes in one or more image capturing devices. The fourth images can have a third image quality that is different than the first image quality, or the fourth images can have the third image quality that is different than an image quality of the fifth images. The third image quality can correspond to the changes in the one or more image capturing devices.

For example, referring to FIG. 1, an image capturing device (e.g., the cell phone 116) that captures the style images (e.g., the cell phone image 118) can have software or hardware changes, such as updates to its image post-processing algorithms. The system can obtain fourth images captured by the cell phone 116 and the fourth images can correspond to the software or hardware updates in the cell phone 116. The fourth images can have an image quality (e.g., lower resolution and higher noise level) that is different than the image quality of the first images (e.g., the high-fidelity images 110 captured by the industrial camera 108). The system can train the convolutional neural network 114 using the fourth images and the first images (e.g., the high-fidelity images 110 captured by the industrial camera 108) to update the convolutional neural network 114. Therefore, the convolutional neural network can be trained to generate synthetic images (e.g., the synthetic cell phone image 120) that can represent the style features capturing the changes in the image capturing device (e.g., the cell phone 116).

In some implementations, an image capturing device that captures the content images (e.g., the industrial camera 108) can have software or hardware changes. The system can obtain fifth images using the image capturing device (e.g., the industrial camera 108) that captures the content images. The fifth images can have an image quality that corresponds to the changes to the image capturing device (e.g., the industrial camera 108). The fourth images corresponding to the changes in the cell phone 116 can have an image quality (e.g., lower resolution and higher noise level) that is different than the image quality of the fifth images. The system can train the convolutional neural network 114 using the fourth images and the fifth images to update the convolutional neural network 114. Therefore, the convolutional neural network can be trained to generate synthetic images (e.g., the synthetic cell phone image 120) that represent the changes in the cell phone 116 as well as the changes to a new input image of the convolutional neural network, where the new input image is generated by the industrial camera 108 with software or hardware changes.

The convolutional neural network can be trained by adjusting content and style parameters of the convolutional neural network to tradeoff content loss versus style loss. The content and style parameters include convolutional layers that have been used to compute the content loss and the style loss. The content parameters of the convolutional neural network can be one or more convolutional layers in the convolutional neural network that can be optimized to generate the content features of the content image. The style parameters of the convolutional neural network can be one or more convolutional layers in the convolutional neural network that can be optimized to generate the style features of the content image.

Figure 3A:
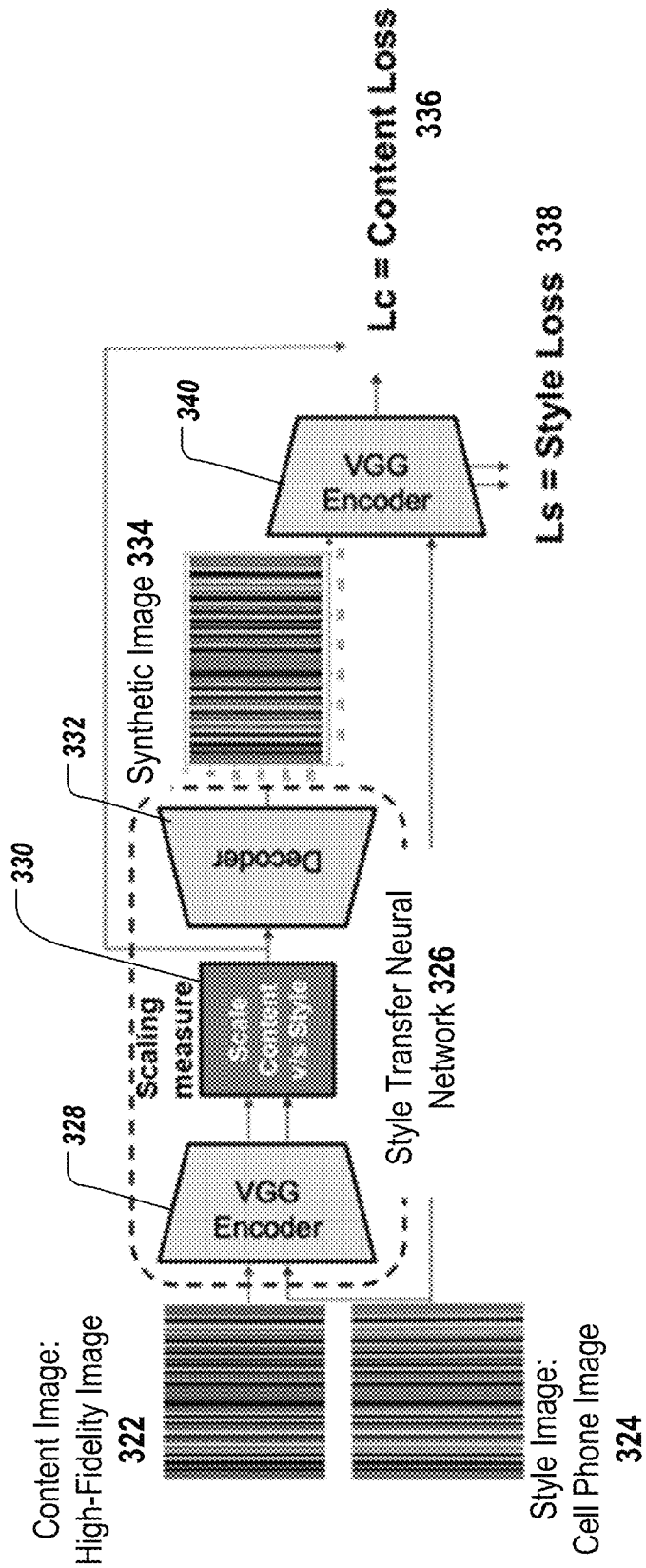
FIG. 3A shows an example of a process to generate a synthetic image using a style transfer neural network.

FIG. 3A shows an example of a process to generate a synthetic image using a style transfer neural network. The style transfer neural network receives a pair of images as input, including a content image (e.g., a high-fidelity image 322) and a style image (e.g., a cell phone image 324). The style transfer neural network 326 includes an encoder that extracts features from an input image (e.g., the content image 322 or the style image 324). The encoder can be any suitable type of network encoder used with convolutional neural networks to extract features from input images. Examples of the encoder include VGG neural network (e.g., VGG-19 or VGG-16) (Simonyan, Karen, and Andrew Zisserman. "*Very deep convolutional networks for large-scale image recognition.*" arXiv preprint arXiv: 1409.1556 (2014)), Residual Network (i.e., ResNet) (He, Kaiming, et al. "*Deep residual learning for image recognition.*" *Proceedings of the IEEE conference on computer vision and pattern recognition*. 2016), EfficientNet (Tan, Mingxing, and Quoc Le. "*Efficientnet: Rethinking model scaling for convolutional neural networks.*" *International Conference on Machine Learning*. PMLR, 2019), Inception-ResNet (Szegedy, Christian, et al. "*Inception-v4, inception-resnet and the impact of residual connections on learning.*" *Thirty-first AAAI conference on artificial intelligence*. 2017), AlexNet, MobileNet, LSTM encoder-decoder, or CNN architectures with custom convolution building blocks. In some implementations, the encoder can include a computer vision algorithm (e.g., Haralick, ORB, SIFT, SURF, GLCM)

that can extract one or more image features. In the example of FIG. 3A, a VGG neural network is used for the VGG encoder 328 and the VGG encoder 340. The VGG encoder 328 and the VGG encoder 340 have the same VGG neural network architecture, and can be implemented as a single encoder. The VGG encoder 328 extracts features from the input image (e.g., the content image 322 or the style image 324). The VGG encoder 340 extracts features from the synthetic image 334.

The style transfer neural network 326 generates a synthetic image 334 through an optimization process. The optimization process iteratively updates the synthetic image to generate a final synthetic image that matches the content statistics of the content image 322 and the style statistics of the style image 324. That is, the content image and the final synthetic image are similar with respect to their content not style, while on the other hand, the final synthetic image represents sufficient style representation from the style image and not the entire style image itself. This optimization process that produces a final synthetic image can be solved using the following loss function that includes a weighted sum of a content loss 336 and a style loss 338:

$$L_{total}(S, C, G) = \alpha L_{content}(C, G) + \beta L_{style}(S, G). \quad (1)$$

Here, S is the style image. (' is the content image. G is the generated synthetic image. The encoder of the neural network (e.g., a VGG encoder 334) extracts content features from the synthetic image 334 and the encoder of the neural network (e.g., a VGG encoder 328) extracts content features from the content image 322. A content loss 336 (i.e., $L_{content}$(C, G)) is computed to measure the difference between the content features extracted from the synthetic image 334 and the content features extracted from the content image 322. The VGG encoder 340 also extracts the style features from the synthetic image 334 and the VGG encoder 328 extracts the style features from the style image 324. A style loss 338 (i.e., $L_{style}$ (S, G)) is computed to measure the difference between the style features extracted from the synthetic image 334 and the style features extracted from the style image 324. In some implementations, the style transfer neural network 326 can include a scaling measure 330 that can scale the content loss and/or the style loss. For example, the scaling measure 330 can include scaling coefficients (e.g., the coefficients a and B in equation (1)) that can control the relative contributions of the content loss and the style loss to the total loss. In some implementations, the style transfer neural network 326 can include a decoder 332. The decoder can generate style reconstructions from the style representations, and can generate content reconstructions from the content representations. The content and style reconstructions can be used to visualize the features being extracted from an input image. More details of the content and style reconstructions are described below in connection with FIG. 3B.

The content and style parameters of the convolutional neural network include convolutional layers that have been used to compute the content loss and the style loss. One or more layers can be selected to compute the content loss. The content loss from a layer l can be the following:

$$L_{content}(C, G, l) = \frac{1}{2} \Sigma_{ij}(a[l](C)_{ij} - a[l](G)_{ij})^2. \quad (2)$$

The a[l](C) is an output from an activation layer l from a content image. The a[l](G) is an output of an activation layer l from a synthetic image, and i, j are the indexes in the activation output. In some implementations, the content loss are from the activation of a single layer l and $L_{content}$ (C, G)=$L_{content}$(C, G, l).

One or more layers can be selected to compute the style loss. In some implementations, multiple layers of the convolutional neural network can be selected in order to generate the style feature representations. Unlike content loss, it may not be sufficient to evaluate the difference of style features in activation units. Rather, a correlation between the activations across different channels of the same layer can be computed by using a Gram Matrix (GM). The style loss from a layer l can be the following:

$$L_{GM}(S, G, l) = \frac{1}{4N_l^2 M_l^2} \sum_{ij}(GM[l](S)_{ij} - GM[l](G)_{ij})^2. \quad (3)$$

The GM[l](S) is the Gram Matrix that computes the correlation between the activations across different channels of the activation layer l from a style image. The GM[l](G) is the Gram Matrix that computes the correlation between the activations across different channels of the activation layer l from a generated synthetic image. The NI represents the number of channels in the activation output of the layer l, and the MI represents the number of the "height times width" of the activation output of the layer l. Multiple activation layers can be utilized and different weights can be assigned to each loss provided by different layers. The overall style loss can be formulated as:

$$L_{style}(S, G) = \Sigma_{l=0}^{L} w_l * L_{GM}(S, G, l). \quad (4)$$

Here, the $w_l$ are the weight for the layer l. In some implementations, the layers selected to compute the style loss can have equal weights.

After computing the total loss $L_{total}$(S, C, G)=$\alpha L_{content}$ (C, G)+$\beta L_{style}$(S, G), an optimizer can be utilized to generate an updated synthetic image such that the loss decreases after each iteration. Examples of the optimizer include stochastic gradient descent (SGD), Adam, RMSProp, etc. The system can run the optimizer for a predetermined number of iterations. The system can then select a generated synthetic image at a particular iteration that has the desired synthetic image output. For example, the system can run the optimizer over 100 iterations with an initial learning rate of 0.01. The synthetic image at the 70th iteration with learning rate of 0.001 and momentum of 1 can be the desired synthetic image.

Figure 3B:
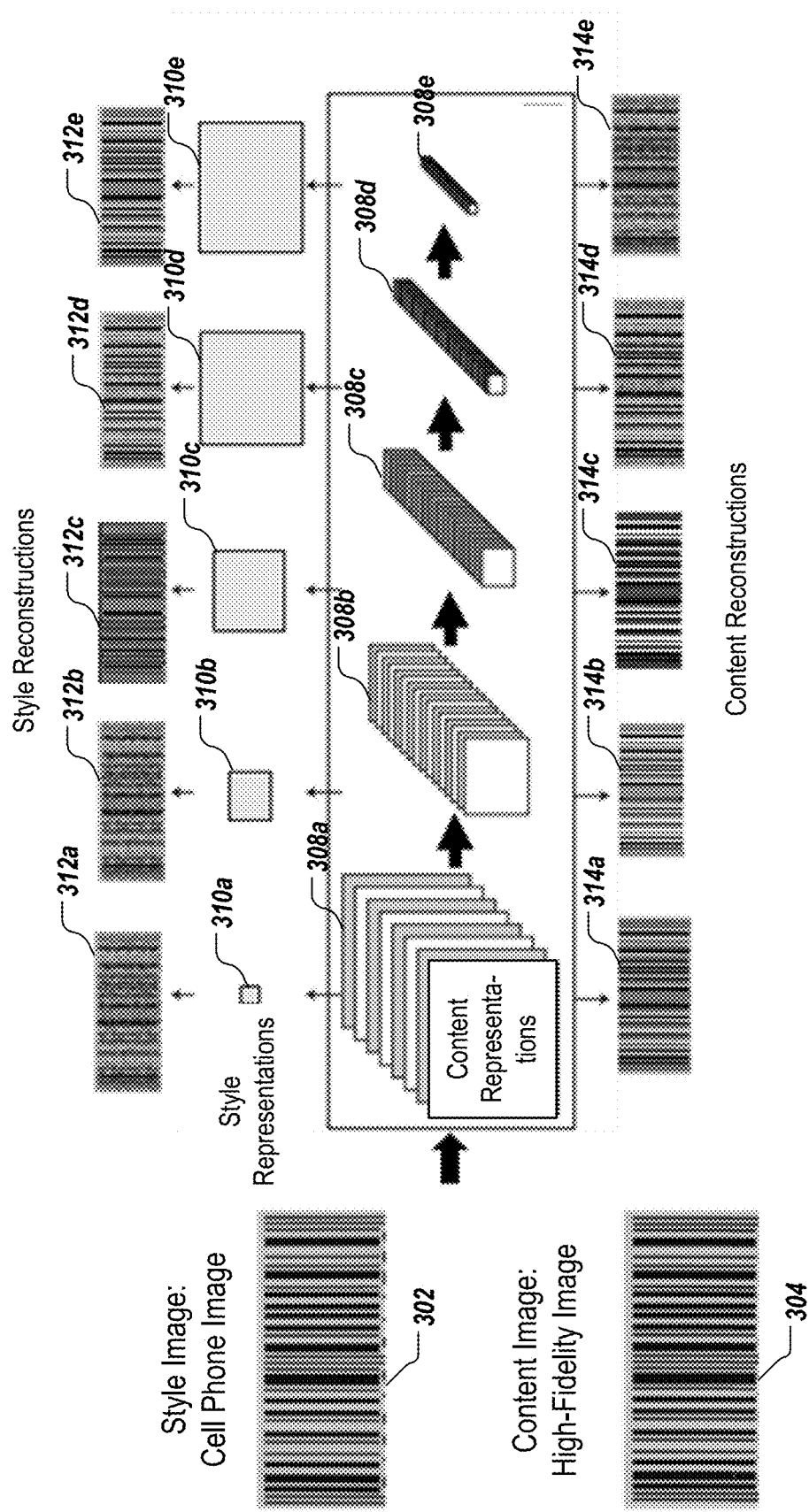
FIG. 3B shows an example of content and style parameters of a style transfer neural network.

FIG. 3B shows an example of content and style parameters of a style transfer neural network. A given image pair (e.g., the cell phone image 302 and the high-fidelity image 304) is represented as a set of filtered images at each processing stage in the convolutional neural network (CNN). The convolutional neural network adopts a pre-trained VGG-19 architecture. The outputs from each layer of the VGG-19 encoder are the feature maps 308a, 308b, 308c, 308d, and 308e. The content features can be a combination of one or more feature maps of the multiple layers of the VGG-19 encoder. The style features can be a combination of one or more feature maps of the multiple layers of the VGG-19 encoder. The content and style parameters of the style transfer neural network are the content layers and the style layers that can be selected and combined to generate the content features and style features of the given image pair. That is, the content and style parameters can control which layers to freeze or unfreeze when generating a synthetic image.

For example, the content layer can include the feature map at the first convolution layer of the third block 308c (e.g., content_layer=['block3_conv1']). The style layer can include the feature map at the second convolution layer of the second block 308b and the feature map at the first convolution layer of the third block 308c (e.g., style_layer=['block2_conv2', 'block3_conv1']). Note that in addition to determining which convolutional layers to freeze and unfreeze at which points during the training process, other parameters can also be adjusted to tradeoff content loss versus style loss, including determining which layers to use to identify content loss and which to identify style loss. Moreover, in some implementations, machine learning architectures other than a VGG architecture can be used.

In some implementations, the content and style representations can be reconstructed to visualize the features being extracted from the given image pair. A decoder (e.g., the decoder 332 in FIG. 3A) can generate style reconstructions from the style representations, and can generate content reconstructions from the content representations. For example, in FIG. 3B, a decoder can generate style reconstructions 312a, 312b, 312c, 312d, and 312e respectively from the style representations 310a, 310b, 310c, 310d, and 310e. A decoder can generate content reconstructions 314a, 314b, 314c, 314d, and 314e respectively from the content representations 308a, 308b, 308c, 308d, and 308e. The content reconstructions and style reconstructs can provide initial guidelines on selecting the optimal content and style parameters (i.e., the content layers and the style layers).

Referring back to 202 of FIG. 2, the training system can adjust the content and style parameters of the convolutional neural network using measurements of information content correlation between third images produced during training and each of the first images and the second images. The measurements can be from a comparison metric associated with the symbology type. The third images are synthetic images generated from the training inputs (e.g., the first images and the second images). The system can measure a first information content correlation between the third image and the first image. The system can measure a second information content correlation between the third image and the second image. The system can evaluate a correlation between the first information content correlation and the second information content correlation.

In some implementations, the comparison metric associated with the symbology type can be generated by a symbology fingerprint algorithm that identifies and analyzes fingerprint signatures in a symbol. That is, the comparison metric can be used to verify that the synthetic image produced by the convolutional neural network preserves an original fingerprint signature in the symbol.

In some implementations, the comparison metric associated with the symbology type can include one or more image similarity metrics. The system can verify the generated synthetic images using the image similarity metrics. Examples of the image similarity metrics include FID (Frechet Inception Distance), MSE (Mean Squared Error) and Structural Similarity Indices (SSIM). For example, the MSE can be computed as the following:

$$MSE = \frac{1}{mn}\sum_{i=0}^{m-1}\sum_{j=0}^{n-1}[I(i, j) - K(i, j)]^2. \quad (5)$$

Here, I and K represent the two images being compared. The m represents the number of rows of pixels of the images, and the i represents the index of a row. The n represents the number of columns of pixels of the images, and j represents the index of that column. For example, the SSIM can be computed as the following:

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}. \quad (6)$$

Here, the $\mu_x$ and $\mu_y$ are the local means of the images x and y respectively. The σx and σy are the standard deviations of the images x and y respectively, and the σn is the cross-covariance between images x and y. The FID is a metric that calculates the distance between feature vectors calculated for real and generated images (e.g., actual cell phone images and synthetic images). Lower FID scores can indicate that the two groups of images are more similar, or have more similar statistics. An FID score that is equal to 0.0 indicates that the two groups of images are identical.

Figure 4:
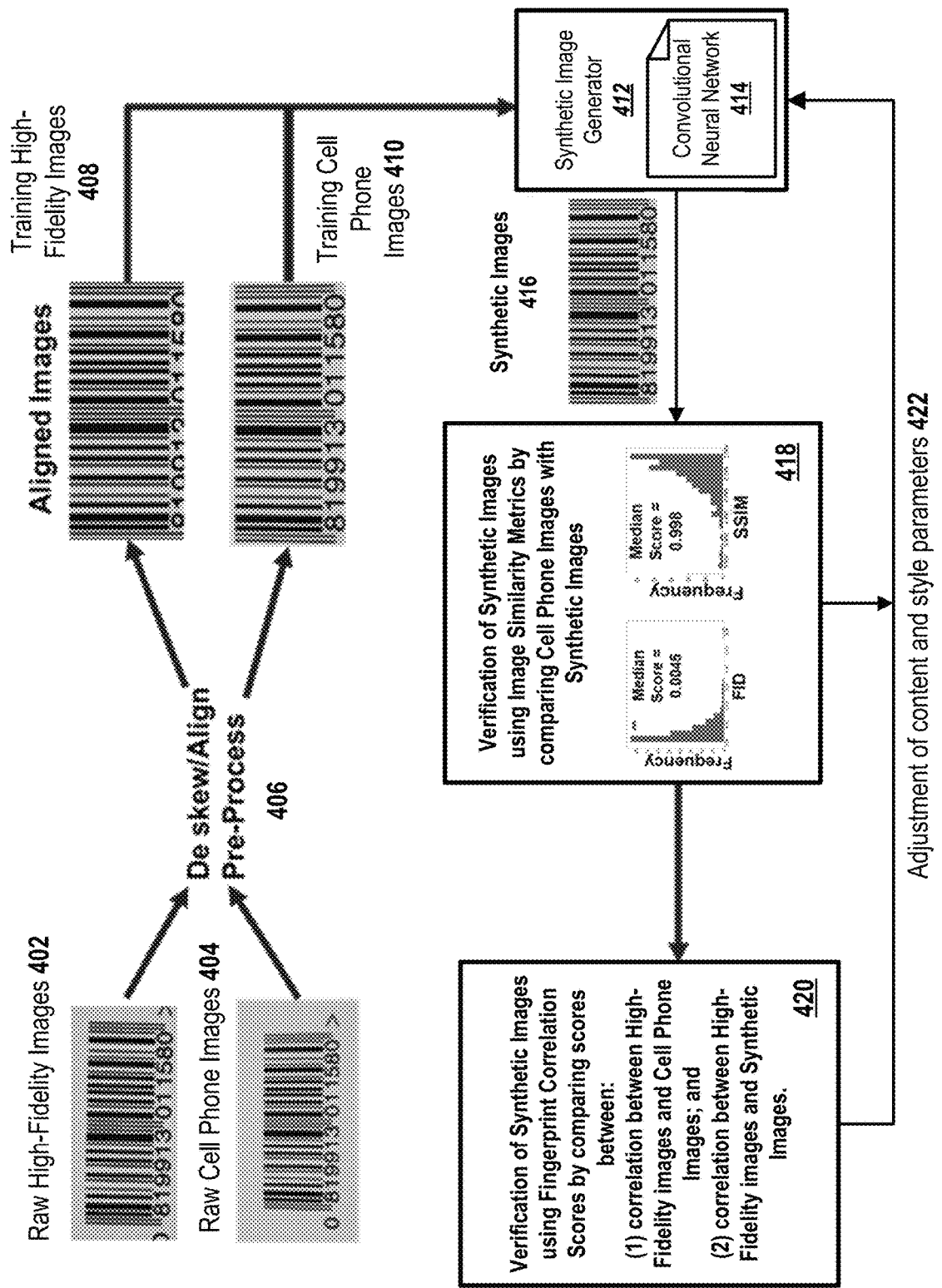
FIG. 4 shows an example of training a convolutional neural network that generates a synthetic image.

FIG. 4 shows an example of training a convolutional neural network that generates a synthetic image. During training, content and style parameters can be adjusted based on the comparison metric associated with the symbology type. The synthetic image generator 412 includes a convolutional neural network 414 (e.g., a style transfer neural network) that is being trained using training data. The training data includes high fidelity images 408 and cell phone images 410.

The convolutional neural network 414 generates a plurality of synthetic images 416 from the training high-fidelity images 408 and the training cell phone images 410. Each synthetic image corresponds to a high-fidelity image and a cell phone image. The training system measures the information content correlation between the synthetic images 416 and each of the training high-fidelity images 408 and the training cell phone images 410.

In some implementations, as shown at 418, the system can verify the synthetic images using image similarity metrics by comparing the training cell phone images 410 with the synthetic images. For example, the system can compute FID scores between the training cell phone images 410 and the synthetic images (e.g., median FID score=0.0045, indicating that the two groups of images have similar statistics). As another example, the system can compute SSIM scores between the training cell phone images 410 and the synthetic images (e.g., median SSIM score=0.998, indicating that the two groups of images are similar). If the one or more image similarity metrics indicates that the synthetic images are not similar to the cell phone images, the content and style parameters can be adjusted 422 such that the synthetic image generator 412 can generate better synthetic images that can be measured more similar to the cell phone images.

In some implementations, as shown at 420, the system can verify the synthetic images using fingerprint correlation scores measured by a fingerprint algorithm. The content and style parameters can be adjusted using measurements of fingerprint correlation scores between the third images (e.g., the synthetic images) produced during the training and each of the first images (e.g., the high-fidelity images) and the second images (e.g., the cell phone images). The system can compute a first set of fingerprint correlation scores between the high-fidelity images 408 and the cell phone images 410. The system can compute a second set of fingerprint correlations scores between the high-fidelity images 408 and the synthetic images 416. Then the system can compare the two sets of correlation scores. The goal is that the two sets of correlation scores are similar to each other, indicating that the synthetic images have similar fingerprint signatures as the cell phone images. If the two sets of correlation scores are not similar, the content and style parameters can be adjusted 422 such that the synthetic image generator 412 can generate better synthetic images that can better preserve the fingerprint signatures in the symbols.

Figure 5:
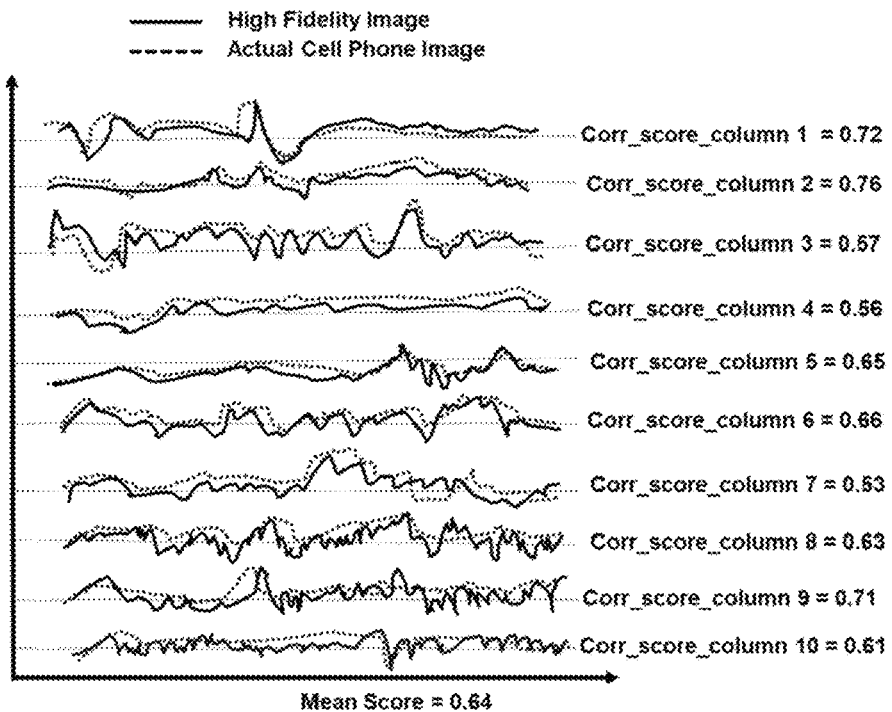
FIG. 5 shows an example of correlation of fingerprint signatures between a high-fidelity image and a cell phone image.

FIG. 5 shows an example of correlation of fingerprint signatures between a high-fidelity image and a cell phone image. A plurality of solid signals are overlapped with a plurality of dotted signals. Each solid signal corresponds to a fingerprint signature in a high-fidelity image of a barcode at a portion of the barcode. The dotted signal corresponds to a fingerprint signature in a corresponding cell phone image of the same barcode at the same portion of the barcode. A higher level of overlap between the solid signals and the dotted signals indicates more correlation between the fingerprint signatures of the high-fidelity image and the cell phone image. A lower level of overlap between the solid signals and the dotted signals indicates less correlation between the fingerprint signatures of the high-fidelity image and the cell phone image. A correlation score can be computed for each pair of solid and dotted signals. A mean correlation score can be computed to represent the overall correlation across the entire barcode. Here, the mean correlation score is 0.64, indicating that most of the fingerprint signature is preserved in the cell phone image with some loss of the details in the fingerprint signature.

Figure 6:
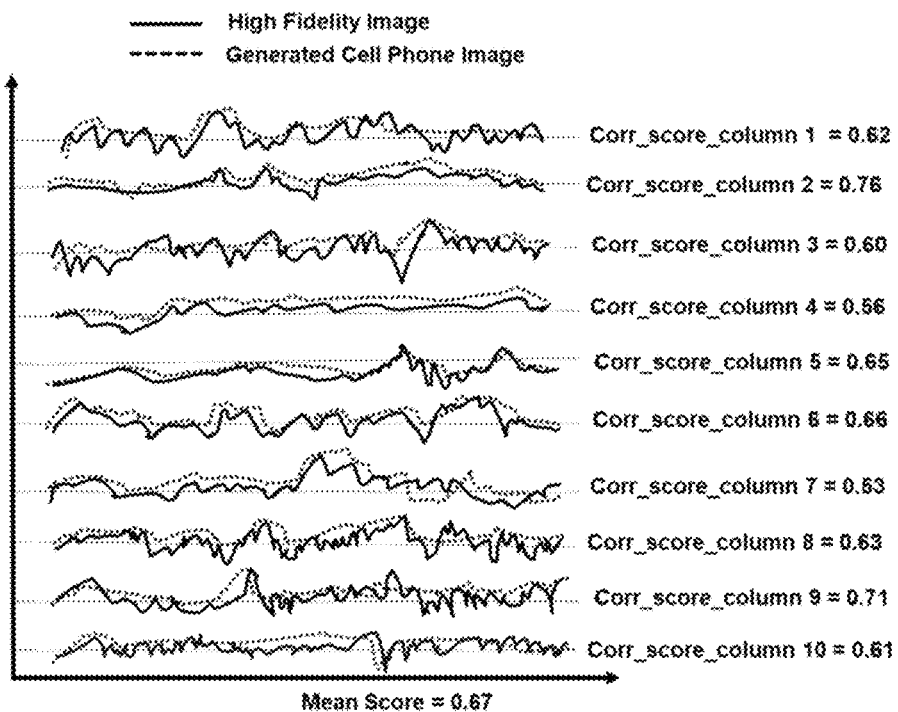
FIG. 6 shows an example of correlation of fingerprint signatures between a high-fidelity image and a generated synthetic image.

FIG. 6 shows an example of correlation of fingerprint signatures between a high-fidelity image and a generated synthetic image. Similar to FIG. 5, each solid signal corresponds to a fingerprint signature in a high-fidelity image of a barcode. The dotted signal corresponds to a fingerprint signature in a corresponding synthetic image of the same barcode. The mean correlation score is 0.67, which is similar to the mean correlation score of 0.64 in FIG. 5. This indicates that the level of overlap between the fingerprint signature of the high-fidelity image and the fingerprint signature of the synthetic image is similar to the level of overlap between the fingerprint signature of the high-fidelity image and the fingerprint signature of the cell phone image. Based on a comparison of the mean correlation scores in FIG. 5 and FIG. 6, the training system can determine that the generated synthetic image has a good representation of the fingerprint signature.

Figure 7:
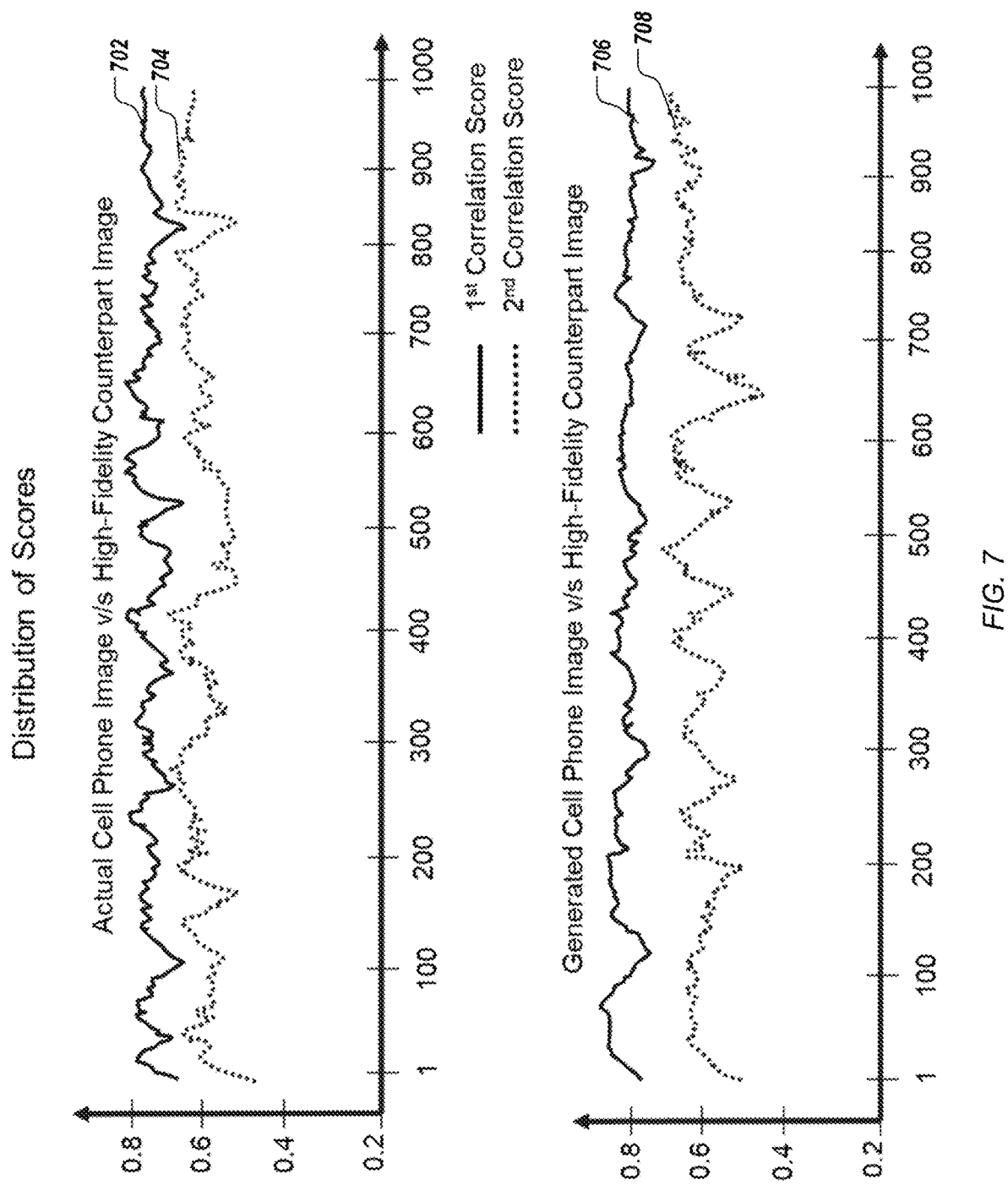
FIG. 7 shows an example of a three-way correlation mapping between each high-fidelity image across its corresponding actual cell phone image and across its corresponding generated synthetic image.

FIG. 7 shows an example of a three-way correlation mapping between each high-fidelity image across its corresponding actual cell phone image and across its corresponding generated synthetic image. The three-way correlation mapping can be applied to N high-fidelity images (e.g., N=1000) and their corresponding cell phone images and synthetic images. The fingerprint correlation scores between the high-fidelity images and each of the synthetic images and the cell phone images can be computed.

In some implementations, the fingerprint correlation scores can include first correlation scores and second correlations scores. In some implementations, the fingerprint correlation scores between the third images (e.g., synthetic images) produced during the training and each of the first images (e.g., the high-fidelity images) and the second images (e.g., the cell phone images) include: first correlation scores between the third images and the first images, second correlation scores between the third images and the first images, first correlation scores between the second images and the first images, and second correlation scores between the second images and the first images. In some implementations, the fingerprint correlation scores between the third images (e.g., synthetic images) produced during the training and each of the first images (e.g., the high-fidelity images) and the second images (e.g., the cell phone images) include: first correlation scores between the third images and the first images, second correlation scores between the third images and the first images, first correlation scores between the third images and the second images, and second correlation scores between the third images and the second images. In some implementations, the first correlation scores and the second correlation scores can be the first and the second highest correlation scores among all the correlation scores.

For example, the first correlation score between a cell phone image (or a synthetic image) and a corresponding high-fidelity image can be the highest correlation score between a unique high-fidelity image when compared across the entire population of high fidelity images. Similarly, the second correlation score between a cell phone image (or a synthetic image) and a corresponding high-fidelity image can be the second highest score between a unique high-fidelity image when compared across the entire population of high fidelity images. The correlation scores can be based on Pearson correlation coefficient, such as:

$$r = \frac{\sum (x_i - \bar{x})(y_i - \bar{y})}{\sqrt{\sum (x_i - \bar{x})^2 \sum (y_i - \bar{y})^2}}. \quad (7)$$

Here, the r represents the correlation coefficient. The $x_i$ represents each value of the image x, and $\bar{x}$ represents the mean of the values of the image x. The $y_i$ represents each value of the image y, and $\bar{y}$ represents the mean of the values of the image y.

For example, in FIG. 7, the first correlation scores 702 between the high-fidelity images and the cell phone images across the N=1000 images are plotted. The second correlation scores 704 between the high-fidelity images and the cell phone images across the N=1000 images are plotted. The first correlation scores 706 between the high-fidelity images and the synthetic images across the N=1000 images are plotted. The second correlation scores 708 between the high-fidelity images and the synthetic images across the N=1000 images are plotted. The distribution of the first correlation scores 702 between the high-fidelity images and the cell phone images is similar to the distribution of the first correlation scores 706 between the high-fidelity images and the synthetic images. The average of the first correlation scores 702 between the high-fidelity images and the cell phone images is 0.75, and the average of the first correlation scores 706 between the high-fidelity images and the synthetic images is 0.8. That is, the two average correlation scores are close to each other. The distribution of the second correlation scores 704 is similar to the distribution of the first correlation scores 708, and both of them have an average second correlation score around 0.55. Therefore, the distributions of the correlation scores in FIG. 7 show that the synthetic images have a good representation of the fingerprint signatures in symbols (e.g., barcodes).

If the correlation score distribution between the high-fidelity image and the synthetic image is significantly different from the correlation score distribution between the high-fidelity image and the cell phone image (e.g., if the difference between the two mean correlation scores are larger than a threshold, for example, 0.06), the training system can determine that the training of the convolutional neural network is not completed. The training system can adjust the content and style parameters to produce an updated synthetic image generator. For example, the training system can select a different content layer and/or one or more different style layers. A new set of synthetic images can be generated with the updated synthetic image generator. The system can validate the synthetic images using the comparison metric associated with the symbology type (e.g., the fingerprint algorithm and/or the one or more image similarity metrics) to determine whether additional training is needed.

Referring back to FIG. 4, in some implementations, the system can perform one or both of: (i) the verification using image similarity metrics at 418, and (ii) the verification using fingerprint correlation scores at 420. In some implementations, the system can first perform the verification using image similarity metrics and then perform the verification using fingerprint correlation scores. In some implementations, the system can first perform the verification using fingerprint correlation scores and then perform the verification using image similarity metrics.

In some implementations, image preprocessing operations can be applied to raw images to generate appropriate training images. Raw images can include raw high-fidelity images 402 and raw cell phone images 404. Each pair of raw high-fidelity image and corresponding raw cell phone image may not be aligned with each other. Some image comparison metrics (e.g., the image similarity metrics and the fingerprint correlation calculation) can require aligned training images (e.g., the cell phone image and the high-fidelity image) and an aligned synthetic image. Preprocessing 406 (e.g., deskewing or image alignment processing) can be applied to the raw images to generate the aligned training images. For example, preprocessing 406 (e.g., barcode detection, cropping, and alignment processing) can be applied to a pair of raw high-fidelity image 402 and raw cell phone image 404 to generate a pair of images (a training high-fidelity image 408 and a training cell phone image 410) that are aligned with each other.

In some implementations, the content and style parameters can be adjusted iteratively by running a grid search over suitable convolutional layers to find optimized convolutional layers. Grid search can automate the process of selecting the optimized convolutional layers that can be used to compute the content loss and the style loss. Grid search tries suitable combinations of the blocks and layers and evaluates the results under the different combinations. A combination of the blocks and layers that produces the best result can be selected as the optimal content and style parameters.

Referring back to FIG. 2, the training system determines whether the training is completed 204. For example, the training system can determine that the training is completed after a number of iterations of training is completed. As another example, the training system can determine that the training is completed after a grid search is completed. As another example, the training system can determine that the training is completed based on a comparison metric associated with the symbology type (e.g., a barcode fingerprint algorithm, or other image similarity metrics). Under the comparison metric, if the generated synthetic images are sufficiently similar to the cell phone images, the training system can determine that the training is completed. If the training system determines that the training is not completed, the training system can continue the training using the first images and second images.

Once the training system determines that the training is completed, the convolution neural network is ready to be used to generate synthetic images (e.g., synthetic cell phone images). A captured image of a symbol of the symbology type that encodes data can be obtained 206. An image can be captured from a capturing device positioned on a product line in which the symbol was printed on a product. For example, a high-fidelity image of a barcode or a QR code can be captured by an industrial camera on a product line.

A synthetic image can be produced 208 from the captured image using the trained machine learning model (e.g., the trained convolutional neural network). For example, a synthetic image generator that includes the trained convolutional neural network can receive a high-fidelity image as an input image, and can generate a synthetic image. The synthetic image can represent the content information encoded in the symbol (e.g., barcode) of the high-fidelity image, and the synthetic image can also represent the style features of a desired second imaging device (e.g., a mobile device). Details of generating a synthetic image from a high-fidelity image can follow the process described above in connection with FIG. 3A.

The synthetic image produced by the trained machine learning model (e.g., the convolutional neural network) can be provided 210 for use by a program configured to identify information in images of symbols of the symbology type. For example, the program can identify information (e.g., manufacturing date, product serial number, price) encoded in the barcode of the synthetic image. In some implementations, the program can include a symbology fingerprint algorithm to verify the symbol printed on the product by processing the synthetic image. For example, the program can identify information presented in variations of a barcode resulting from a printing device used to produce the barcode. That is, the program can identify the fingerprint signature of the barcode in the synthetic image. The program can perform verification of the barcode in the synthetic image (e.g., using a fingerprint algorithm). The program can compare the fingerprint signature identified in the synthetic image with an authentic fingerprint signature (e.g., a fingerprint signature of a high-fidelity image) that captures a barcode of a corresponding authentic product. Note that the comparison metric used here may or may not be the same as the comparison metric used during the training of the convolutional neural network.

In some implementations, the program can employ a symbology fingerprint algorithm that is being developed, and the system can use the synthetic image to test the symbology fingerprint algorithm being developed. In some implementations, the symbology fingerprint algorithm can employ one or more machine learning techniques, and the synthetic images can be used as training data for the machine learning. For example, the system can include a training subsystem that trains a symbol verification algorithm (e.g., a fingerprint algorithm) using the synthetic images generated by the synthetic image generator as a part of the training data. Instead of manually capturing cell phone images of examples of barcodes, the synthetic image generator can automatically and efficiently generate a large number of synthetic images from high-fidelity images of the examples of symbols. The generated synthetic images can have similar style statistics to the real cell phone images. The synthetic cell phone images can be used to train, validate and/or supplement a fingerprint algorithm, improving the accuracy and performance of the fingerprint algorithm. Moreover, the ability to readily generate synthetic images that accurately represent the image properties of various image capturing devices (e.g., smart phone cameras) facilitates the further development of algorithms usable for symbol/product traceability and counterfeit detections since this image-translation process (converting high-fidelity images to smart phone captures) is able to produce substantial amounts of training data for use in such algorithm development work.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as a hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desired results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims.

What is claimed is:

1. A method comprising:
   obtaining, by at least one data processing device, a captured image of a symbol of a symbology type that encodes data;
   producing, by the at least one data processing device, a synthetic image from the captured image using a trained machine learning model,
      wherein the trained machine learning model has been trained using (i) first images of examples of symbols of the symbology type, and (ii) second images of the examples of symbols of the symbology type,
      wherein the first images have a first image quality, the second images have a second image quality that is different than the first image quality, and
      wherein one or more parameters of the machine learning model have been adjusted responsive to one or more image features to tradeoff content loss versus style loss using measurements of information content correlation between third images produced during training and each of the first images and the second images, the measurements being from a comparison metric associated with the symbology type; and
   providing, by the at least one data processing device, the synthetic image produced by the trained machine learning model for use by a program configured to identify information in images of symbols of the symbology type.

2. The method of claim 1, wherein the trained machine learning model comprises a convolutional neural network, and the one or more parameters comprise content and style parameters of the convolutional neural network.

3. The method of claim 2, wherein the content and style parameters comprise convolutional layers that have been used to compute the content loss and the style loss, wherein the content and style parameters have been adjusted iteratively by running a grid search over suitable convolutional layers to find optimized convolutional layers.

4. The method of claim 2, wherein the comparison metric associated with the symbology type is generated by a symbology fingerprint algorithm, and wherein the content and style parameters have been adjusted using measurements of fingerprint correlation scores between the third images produced during the training and each of the first images and the second images.

5. The method of claim 4, wherein the fingerprint correlation scores between the third images produced during the training and each of the first images and the second images comprise: first correlation scores between the third images and the first images, second correlation scores between the third images and the first images, first correlation scores between the third images and the second images, and second correlation scores between the third images and the second images.

6. The method of claim 1, wherein the first images have been captured with a first image capturing device, the second images have been captured with at least two second image capturing devices, and each of the at least two second image capturing devices are of a different type than the first image capturing device and each remaining one or more of the at least two second image capturing devices.

7. The method of claim 1, wherein the comparison metric associated with the symbology type is generated by a symbology fingerprint algorithm, the program employs the symbology fingerprint algorithm, the obtaining comprises receiving the captured image from an image capturing device positioned on a product line in which the symbol was printed on a product, and the providing comprises using the symbology fingerprint algorithm in the program to verify the symbol printed on the product by processing the synthetic image.

8. The method of claim 1, wherein the comparison metric associated with the symbology type comprises one or more image similarity metrics.

9. The method of claim 1, wherein the synthetic image produced by the trained machine learning model preserves an original fingerprint signature in the symbol.

10. The method of claim 1, wherein the program employs a symbology fingerprint algorithm being developed, and the providing comprises using the synthetic image to test the symbology fingerprint algorithm being developed.

11. The method of claim 1, comprising training the trained machine learning model using fourth images and either the first images or fifth images to update the trained machine learning model in view of changes in one or more image capture devices, wherein the fourth images have a third image quality that is different than the first image quality or than an image quality of the fifth images, and wherein the third image quality corresponds to the changes in the one or more image capture devices.

12. A system comprising:
   at least one processor, and
   at least one non-transitory storage media storing instructions that, when executed by the at least one processor, cause the at least one processor to:
      obtain a captured image of a symbol of a symbology type that encodes data;
      produce a synthetic image from the captured image using a trained machine learning model,
         wherein the trained machine learning model has been trained using (i) first images of examples of symbols of the symbology type, and (ii) second images of the examples of symbols of the symbology type,
         wherein the first images have a first image quality, the second images have a second image quality that is different than the first image quality, and
         wherein one or more parameters of the machine learning model have been adjusted responsive to one or more image features to tradeoff content loss versus style loss using measurements of information content correlation between third images produced during training and each of the first images and the second images, the measurements being from a comparison metric associated with the symbology type; and provide the synthetic image produced by the trained machine learning model for use by a program configured to identify information in images of symbols of the symbology type.

13. The system of claim 12, wherein the trained machine learning model comprises a convolutional neural network, and the one or more parameters comprise content and style parameters of the convolutional neural network.

14. The system of claim 13, wherein the content and style parameters comprise convolutional layers that have been used to compute the content loss and the style loss, wherein the content and style parameters have been adjusted iteratively by running a grid search over suitable convolutional layers to find optimized convolutional layers.

15. The system of claim 13, wherein the comparison metric associated with the symbology type is generated by a symbology fingerprint algorithm, and wherein the content and style parameters have been adjusted using measurements of fingerprint correlation scores between the third images produced during the training and each of the first images and the second images.

16. The system of claim 15, wherein the fingerprint correlation scores between the third images produced during the training and each of the first images and the second images comprise: first correlation scores between the third images and the first images, second correlation scores between the third images and the first images, first correlation scores between the third images and the second images, and second correlation scores between the third images and the second images.

17. The system of claim 12, wherein the first images have been captured with a first image capturing device, the second images have been captured with at least two second image capturing devices, and each of the at least two second image capturing devices are of a different type than the first image capturing device and each remaining one or more of the at least two second image capturing devices.

18. The system of claim 12, wherein the comparison metric associated with the symbology type is generated by a symbology fingerprint algorithm, the program employs the symbology fingerprint algorithm, wherein the instructions cause the at least one processor to receive the captured image from an image capturing device positioned on a product line in which the symbol was printed on a product, and use the symbology fingerprint algorithm in the program to verify the symbol printed on the product by processing the synthetic image.

19. The system of claim 12, wherein the program employs a symbology fingerprint algorithm being developed, and wherein the instructions cause the at least one processor to use the synthetic image to test the symbology fingerprint algorithm being developed.

20. The system of claim 12, wherein the instructions cause the at least one processor to train the trained machine learning model using fourth images and either the first images or fifth images to update the trained machine learning model in view of changes in one or more image capture devices, wherein the fourth images have a third image quality that is different than the first image quality or than an image quality of the fifth images, and wherein the third image quality corresponds to the changes in the one or more image capture devices.

* * * * *